(12) United States Patent
Butler (10) Patent No.: US 8,313,598 B2
(45) Date of Patent: Nov. 20, 2012

(54) METHOD OF MANUFACTURING A CERAMIC MATRIX COMPOSITE ARTICLE

(75) Inventor: Edwin G. Butler, Warwickshire (GB)

(73) Assignee: Rolls-Royce PLC, London (GB)

( * ) Notice: Subject to any disclaimer, the term of this patent is extended or adjusted under 35 U.S.C. 154(b) by 85 days.

(21) Appl. No.: 13/043,907

(22) Filed: Mar. 9, 2011

(65) Prior Publication Data

US 2011/0259506 A1 Oct. 27, 2011

(30) Foreign Application Priority Data

Apr. 21, 2010 (GB) .................................. 1006625.6

(51) Int. Cl.
  *C03B 29/00* (2006.01)
  *B29C 65/00* (2006.01)
  *C04B 33/34* (2006.01)

(52) U.S. Cl. ..................... 156/89.11; 156/60; 156/89.27; 156/250

(58) Field of Classification Search .................. 156/60, 156/89.11, 89.27, 250, 264
See application file for complete search history.

(56) References Cited

U.S. PATENT DOCUMENTS

| | | | |
|---|---|---|---|
| 4,213,930 A * | 7/1980 | Goodrich et al. | 264/135 |
| 4,255,478 A * | 3/1981 | Crane | 428/113 |
| 4,568,594 A | 2/1986 | Hordonneau et al. | |
| 5,024,978 A | 6/1991 | Allaire et al. | |
| 5,154,787 A | 10/1992 | Gardner et al. | |
| 5,209,804 A * | 5/1993 | Trudeau | 156/364 |
| 5,250,243 A | 10/1993 | Allaire et al. | |
| 5,281,439 A | 1/1994 | Leluan et al. | |
| 5,402,962 A * | 4/1995 | Blaimschein | 242/559 |
| 5,480,508 A * | 1/1996 | Manabe et al. | 156/353 |
| 5,547,622 A | 8/1996 | Chalasani et al. | |
| 5,569,422 A | 10/1996 | Astier et al. | |
| 5,587,041 A * | 12/1996 | Sandusky et al. | 156/441 |

(Continued)

FOREIGN PATENT DOCUMENTS

EP 0 537 966 A1 4/1993

(Continued)

OTHER PUBLICATIONS

European Search Report issued in European Patent Application No. 11157435 dated Jun. 16, 2011.

(Continued)

*Primary Examiner* — Philip Tucker
*Assistant Examiner* — Alex Efta
(74) *Attorney, Agent, or Firm* — Oliff & Berridge, PLC (57) ABSTRACT

A method of manufacturing a ceramic matrix composite article comprising the steps of: —
a) forming a slurry consisting of water, polyvinyl alcohol, nitric acid, polyethylene glycol and alumina particles only, b) providing a length of fabric, the fabric comprising a plurality of ceramic fibres, c) applying slurry to at least one of the sides of the length of fabric such that the slurry adheres and impregnates the length of fabric, d) drying the slurry impregnated length of fabric, e) cutting the slurry impregnated length of fabric into a plurality of pieces of slurry impregnated laminates of fabric, f) applying water to each of the pieces of slurry impregnated laminates of fabric to reactivate the slurry, g) stacking the plurality of pieces of slurry impregnated laminates of fabric on a first mould part, h) consolidating the plurality of pieces of slurry impregnated laminates of fabric on the mould part, and i) sintering the stack of the plurality of pieces of slurry impregnated laminates of fabric to form an alumina matrix composite article.

26 Claims, 4 Drawing Sheets

U.S. PATENT DOCUMENTS

| | | |
|---|---|---|
| 6,251,317 B1 | 6/2001 | Lundberg et al. |
| 2003/0034113 A1* | 2/2003 | Butler et al. ............... 156/89.11 |
| 2006/0090856 A1* | 5/2006 | Nelson et al. ................. 156/510 |
| 2007/0007678 A1 | 1/2007 | Benitsch |
| 2007/0065676 A1 | 3/2007 | Bacalski et al. |
| 2008/0193788 A1 | 8/2008 | Nakama |
| 2009/0162556 A1 | 6/2009 | Boutwell et al. |

FOREIGN PATENT DOCUMENTS

| | | |
|---|---|---|
| EP | 1 839 720 A1 | 10/2007 |
| EP | 1 880 984 A2 | 1/2008 |
| GB | 2 081 733 A | 2/1982 |
| GB | 2 347 113 A | 8/2000 |
| WO | WO 02/085618 A1 | 10/2002 |
| WO | WO 03/047827 A1 | 6/2003 |

OTHER PUBLICATIONS

Search Report issued in corresponding British Patent Application No. 1006625.6 dated Aug. 26, 2010.

* cited by examiner

METHOD OF MANUFACTURING A CERAMIC MATRIX COMPOSITE ARTICLE

The present invention relates to a method of manufacturing a ceramic matrix composite article and in particular to a method of manufacturing a ceramic matrix composite component for a gas turbine engine, in particular a ceramic matrix composite component for a combustor, a turbine or an exhaust of a gas turbine engine.

U.S. Pat. No. 5,569,422 describes a method of manufacturing an alumina matrix composite article comprising providing laminates of fabric, impregnating the laminates of fabric with a fluid composition comprising a liquid precursor of alumina, alumina powder in suspension and greater than 5 wt % thermoplastic resin, draping and moulding the impregnated laminates of fabric, heat treating the impregnated laminates of fabric to cause the thermoplastic resin to soften and bond the impregnated laminates of fabric together and heat treating to cause the resin to be pyrolysed and the precursor of alumina to be transformed into alumina to bond the laminates of fabric together. U.S. Pat. No. 5,569,422 requires a thermoplastic resin and an aluminium oxychloride precursor of alumina.

A problem with this process is that the precursor of alumina used to form the alumina matrix comprises aluminium oxychloride and this breaks down to liberate chlorine which will attack and weaken the reinforcing fibres.

Our UK patent GB2347113B describes a method of manufacturing a ceramic matrix composite article comprising the steps of forming a slurry comprising a ceramic sol, filler material and a suspension medium, forming a plurality of laminates of fibres, applying the slurry to each of the plurality of laminates of fibres, stacking the plurality of fibres on a mould and applying pressure to the stack of laminates of fibres to remove the suspension medium from the slurry to solidify the ceramic sol and thereby produce a ceramic matrix composite.

In the current process of manufacturing a ceramic matrix composite, the laminates of fabric are dipped in a water based ceramic slurry to infiltrate ceramic particles into the laminates of fabric. The laminates of fabric are cut to size, then layed up on a mould, placed in a vacuum bag and the vacuum bag is evacuated to compact and remove the water. The compacted laminates of fabric are then sintered at a high temperature to densify the matrix to produce a ceramic matrix composite.

A problem with this process is that the method of infiltrating the ceramic particles into the laminates of fabric, by dipping of the laminates of fabric into the water based ceramic slurry, does not adequately control the density and/or the distribution of the ceramic particles, which results in significant variations in the structure and mechanical properties within a final ceramic matrix composite article. In addition there is a tendency for loss of fibres by fraying at the edges and distortion of the weave of the laminates of fabric during handling of the wet laminates of fabric during the lay-up of the laminates of fabric on the mould, which contribute to property variation. The loss of definition at the edges of the laminates of fabric means that there is no prospect of making a ceramic matrix composite article to near net shape. Also this process is inherently wasteful of the raw materials. The vacuum bag does not provide the optimum pressure for consolidation of the laminates of fabric and there is a high probability that delamination of the laminates of fabric will occur in a ceramic matrix composite article formed by this method.

Accordingly the present invention seeks to provide a novel method of manufacturing a ceramic matrix composite article, which reduces, preferably overcomes the above mentioned problems.

Accordingly the present invention provides a method of manufacturing a ceramic matrix composite article comprising the steps of: —
a) forming a slurry consisting of water, dispersant, a water soluble polymer binder and ceramic particles,
b) providing a length of fabric, the fabric comprising a plurality of ceramic fibres,
c) applying slurry to at least one of the sides of the length of fabric such that the slurry adheres and impregnates the length of fabric,
d) drying the slurry impregnated length of fabric,
e) cutting the slurry impregnated length of fabric into a plurality of pieces of slurry impregnated laminates of fabric,
f) applying water to each of the pieces of slurry impregnated laminates of fabric to reactivate the slurry,
g) stacking the plurality of pieces of slurry impregnated laminates of fabric on a first mould part,
h) consolidating the plurality of pieces of slurry impregnated laminates of fabric on the mould part, and
i) sintering the stack of the plurality of pieces of slurry impregnated laminates of fabric to form a ceramic matrix composite article.

Preferably step h) comprises placing a second mould part over the first mould part and the stack of the plurality of pieces of slurry impregnated laminates of fabric and pressing the two mould parts together.

Alternatively step h) comprises placing the first mould part and the stack of the plurality of pieces of slurry impregnated laminates of fabric into a vacuum bag and evacuating the vacuum bag.

Preferably step h) comprises drying the stack of the plurality of pieces of slurry impregnated laminates of fabric and heating the stack of the plurality of pieces of slurry impregnated laminates of fabric.

Preferably in step a) the ceramic particles are oxide particles, carbide particles, silicide particles, boride particles, nitride particles, silicate particles or a mixture of any two or more of these types of particles.

Preferably in step a) the ceramic particles are silica particles, alumina particles, mullite particles or a mixture of any two or more of these types of particles.

Preferably in step b) the ceramic fibres comprise silicon carbide fibres, silicon nitride fibres, alumina fibres, mullite fibres, aluminosilicate fibres or alumina-mullite fibres. The fabric may comprise a mixture of any two or more of these types of fibres.

Preferably step c) comprises applying slurry to both of the sides of the length of fabric such that the slurry adheres to and impregnates the length of fabric.

Preferably step h) comprises drying at room temperature.

Preferably step h) comprises heating at a temperature of 50° C. to 150° C. for up to 15 hours.

Preferably step h) comprises heating at a temperature of 80° C. for up to 12 hours to remove water from the impregnated laminates of fabric.

Preferably step h) comprises heating at a temperature of 120° C. for 2 hours.

Preferably step i) comprises sintering at a temperature of 1100° C. to 1300° C. for up to 10 hours.

Preferably step i) comprises sintering at a temperature of 1200° C. for up to 10 hours.

Step d) may comprise drying for several hours at room temperature or drying at an elevated temperature.

Step a) may comprise forming a slurry consisting of water, polyvinyl alcohol, nitric acid, polyethylene glycol and ceramic particles only.

The ceramic matrix composite may be an alumina matrix composite and step a) may comprise forming a slurry comprising 26 wt % water, 1.14 wt % polyvinyl alcohol, 2.28 wt % nitric acid, 2.28 wt % polyethylene glycol and the remainder alumina particles and incidental impurities.

The ceramic matrix composite may be an alumina matrix composite and the slurry in step a) may comprise 20 cm$^3$ solution of 5 wt % polyvinyl alcohol, 4 cm$^3$ of deionised water, 2 cm$^3$ of 10% nitric acid and 2 cm$^3$ of polyethylene glycol and 60 g of alumina particles or multiples of this formula.

Step a) may comprise forming a slurry consisting of water, polyvinyl alcohol, nitric acid, polyethylene glycol, ceramic particles and a ceramic precursor.

The ceramic precursor may be an alumina precursor, a silica precursor or a combination of an alumina precursor and a silica precursor.

The ceramic matrix composite may comprise an alumina matrix composite and the slurry in step a) may comprise 18.57 wt % de-ionised water, 4.64 wt % polyvinyl alcohol, 1.94 wt % 10% nitric acid, 1.75 wt % polyethylene glycol, 3.48 wt % aluminium chloride hexahydrate and the remainder alumina particles and incidental impurities.

The ceramic matrix composite may comprise an alumina matrix composite and the slurry in step a) may comprise 69.4 ml of polyvinyl alcohol, 300 ml of deionised water, 30 ml of 10% nitric acid, 25 ml of polyethylene glycol, 8.26 ml of aluminium chloride hexahydrate and 220 g of alumina particles or multiples of this formula.

Preferably the ceramic matrix composite article is a component of a gas turbine engine. Preferably the component is a component of a combustion chamber, a component of a turbine or a component of an exhaust system. The component of a combustion chamber may be a combustion chamber wall, a tile or a heat shield.

The present invention also provides a method of manufacturing a ceramic matrix composite article comprising the steps of: —
a) forming a slurry consisting of water, polyvinyl alcohol, nitric acid, polyethylene glycol and ceramic particles,
b) providing a length of fabric, the fabric comprising a plurality of ceramic fibres,
c) applying slurry to at least one of the sides of the length of fabric such that the slurry adheres and impregnates the length of fabric,
d) drying the slurry impregnated length of fabric,
e) cutting the slurry impregnated length of fabric into a plurality of pieces of slurry impregnated laminates of fabric,
f) applying water to each of the pieces of slurry impregnated laminates of fabric to reactivate the slurry,
g) stacking the plurality of pieces of slurry impregnated laminates of fabric on a first mould part,
h) consolidating the plurality of pieces of slurry impregnated laminates of fabric on the mould part, and
i) sintering the stack of the plurality of pieces of slurry impregnated laminates of fabric to form a ceramic matrix composite article.

The present invention also provides a method of manufacturing an alumina matrix composite article comprising the steps of: —
a) forming a slurry consisting of water, polyvinyl alcohol, nitric acid, polyethylene glycol and alumina particles,
b) providing a length of fabric, the fabric comprising a plurality of ceramic fibres,
c) applying slurry to at least one of the sides of the length of fabric such that the slurry adheres and impregnates the length of fabric,
d) drying the slurry impregnated length of fabric,
e) cutting the slurry impregnated length of fabric into a plurality of pieces of slurry impregnated laminates of fabric,
f) applying water to each of the pieces of slurry impregnated laminates of fabric to reactivate the slurry,
g) stacking the plurality of pieces of slurry impregnated laminates of fabric on a first mould part,
h) consolidating the plurality of pieces of slurry impregnated laminates of fabric on the mould part, and
i) sintering the stack of the plurality of pieces of slurry impregnated laminates of fabric to form an alumina matrix composite article.

The present invention will be more fully described by way of example with reference to the accompanying drawings, in which: —

Figure 1:
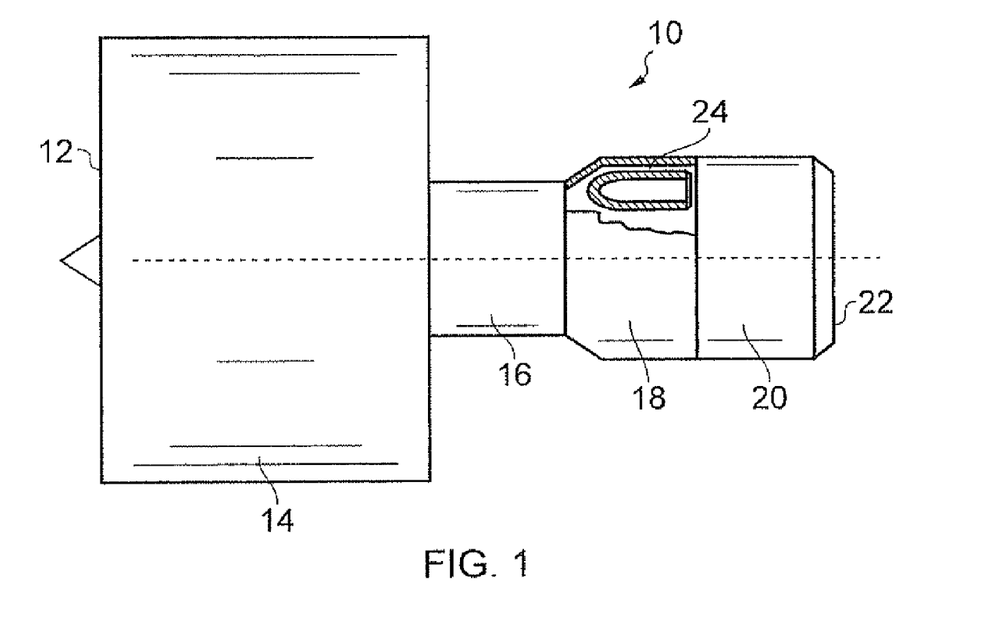
FIG. 1 shows a turbofan gas turbine engine having a ceramic matrix composite article manufactured using a method according to the present invention.

A turbofan gas turbine engine 10, as shown in FIG. 1, comprises in axial flow series an intake 12, a fan section 14, a compressor section 16, a combustion section 18, a turbine section 20 and an exhaust 22. The fan section comprises a fan (not shown). The compressor section 16 comprises an intermediate-pressure compressor (not shown) and a high-pressure compressor (not shown). The turbine section 20 comprises a high-pressure turbine (not shown), an intermediate-pressure turbine (not shown) and a low-pressure turbine (not shown). The low-pressure turbine is arranged to drive the fan, the intermediate-pressure turbine is arranged to drive the intermediate-pressure compressor and the high-pressure turbine is arranged to drive the high-pressure compressor. The combustion section 18 comprises an annular combustion chamber 24 or a plurality of tubular combustion chambers 24 arranged in an annulus. The, or each, combustion chamber 24 comprises a ceramic matrix composite and has been manufactured using a method according to the present invention.

Figure 2:
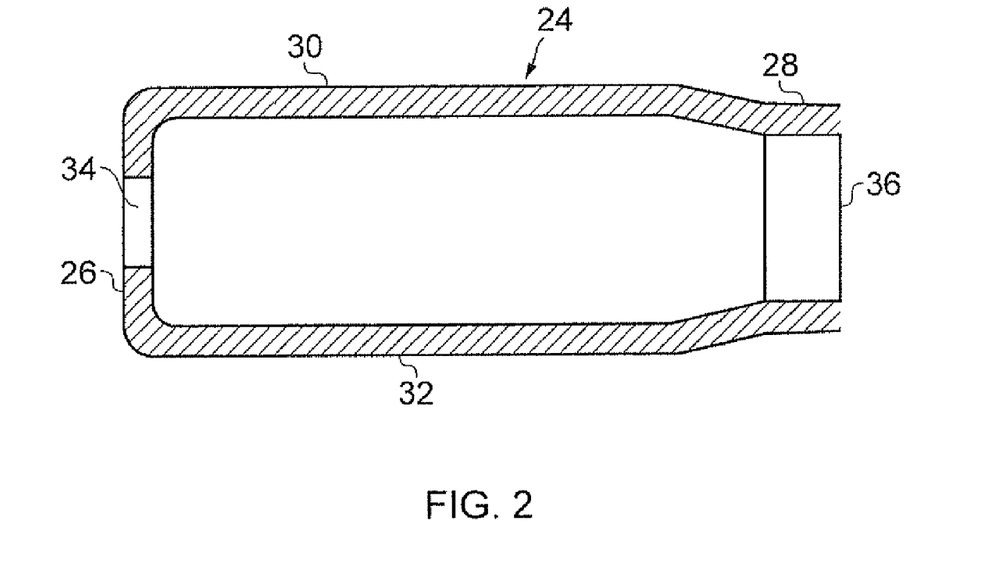
FIG. 2 shows an enlarged view of a ceramic matrix composite article shown in FIG. 1.

FIG. 2 is an enlarged view of a combustion chamber 24 shown in FIG. 1. The annular combustion chamber 24 has an upstream end 26, a downstream end 28, an annular outer wall 30 and an annular inner wall 32. The upstream end 26 has a plurality of apertures 34 to receive fuel burners (not shown) and the downstream end 28 has a plurality of nozzle guide vanes 36 to direct hot exhaust gases to the turbine section 20. In FIG. 2 the annular combustion chamber 24 comprises a ceramic matrix composite article and in particular the upstream end 26, the outer annular wall 30 and the inner annular wall 32 of the annular combustion chamber 24 comprise a ceramic matrix composite manufactured using a method of manufacturing a ceramic matrix composite article according to the present invention.

Figure 3:
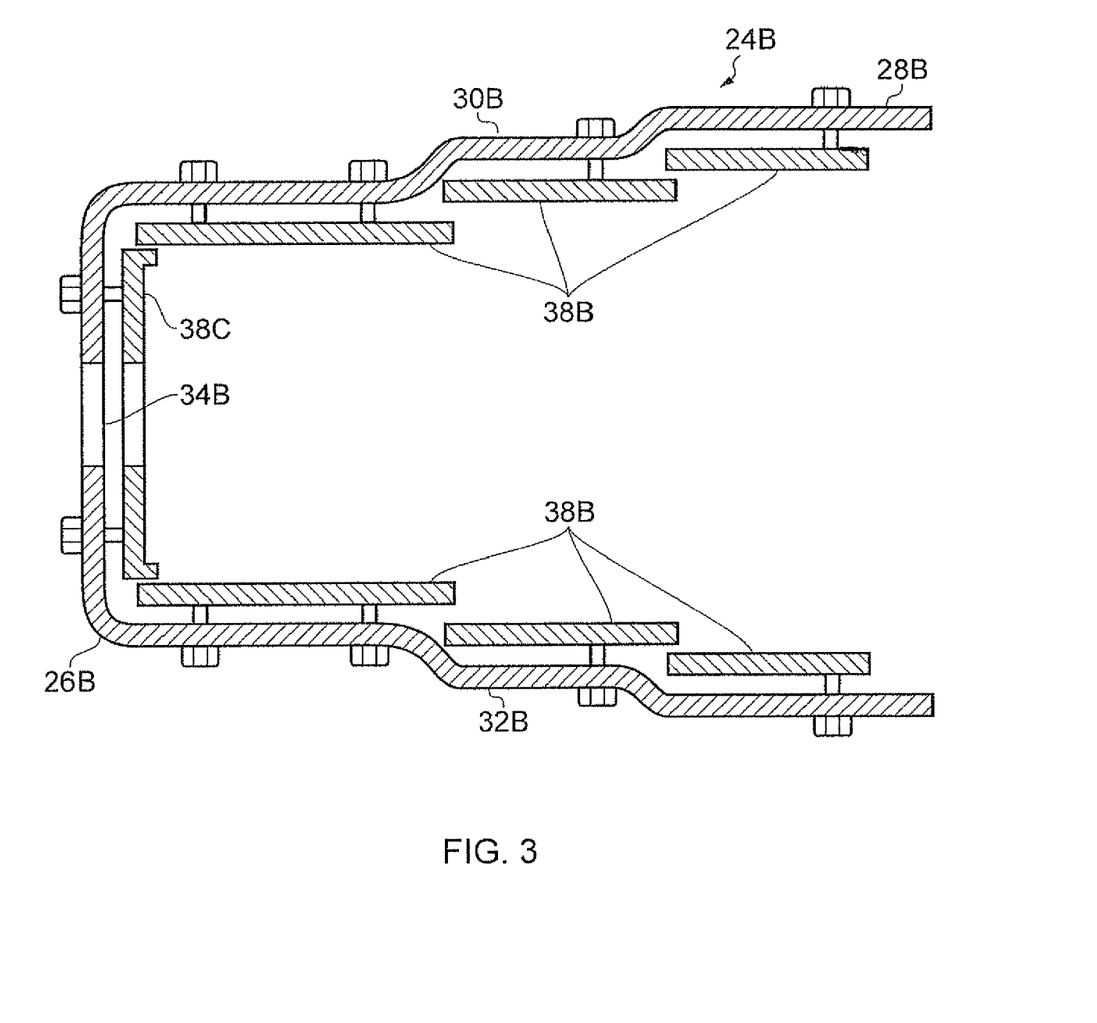
FIG. 3 shows an enlarged view of an alternative ceramic matrix composite article shown in FIG. 1.

FIG. 3 is an enlarged view of an alternative combustion chamber shown in FIG. 1. The annular combustion chamber 24B comprises a metallic upstream end 26B, a downstream end 28B, a metallic annular outer wall 30B, a metallic annular inner wall 32B and a plurality of ceramic matrix composite tiles 38B secured to the radially inner surface of the annular outer wall 30B and/or the radially outer surface of the annular inner wall 32B and/or ceramic matrix composite heat shields 38C secured to the upstream end 26B of the annular combustion chamber 24B. The annular combustion chamber 24 or the annular combustion chamber 24B may be a low emission combustion chamber.

Figure 4:
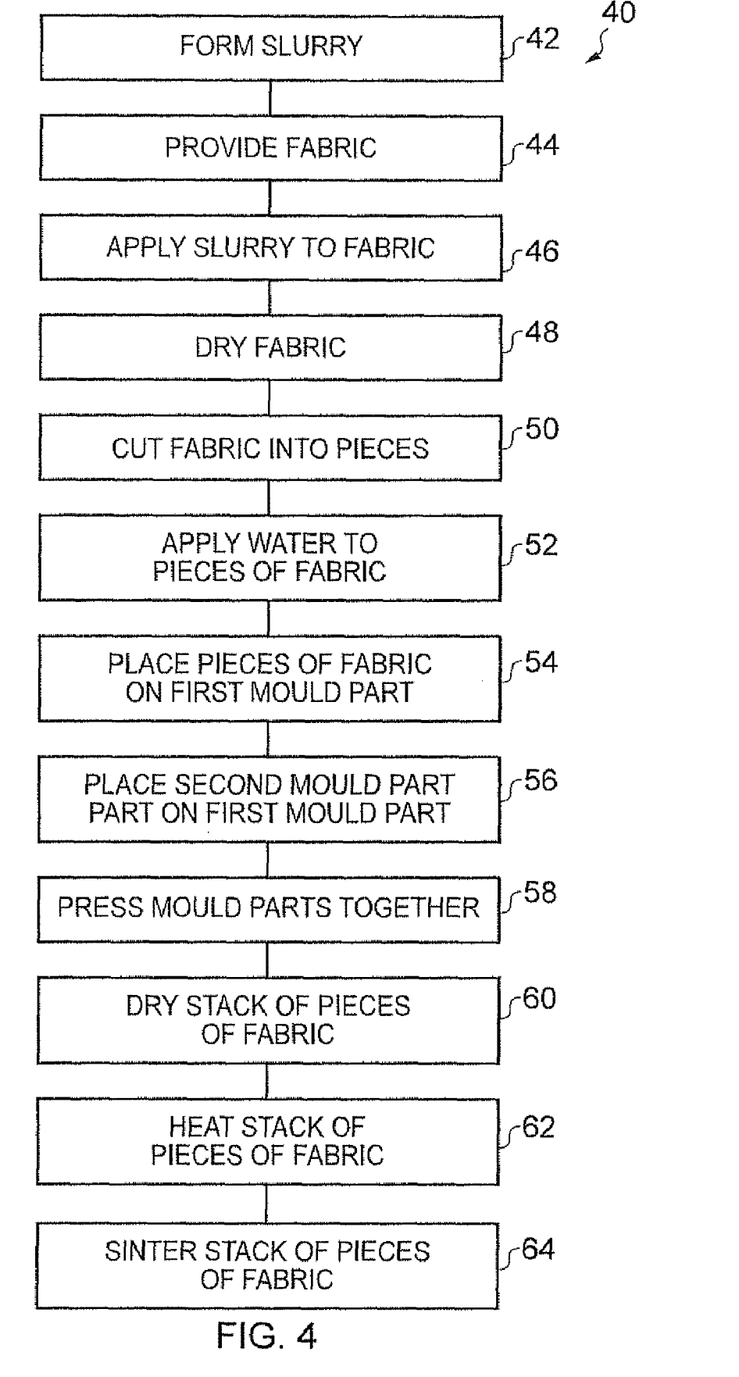
FIG. 4 is a flow chart of a method of manufacturing a ceramic matrix composite article according to the present invention.

A method of manufacturing 40 a ceramic matrix composite article 24 according to the present invention, as shown in FIG. 4, comprises a) forming a slurry comprising water, polyvinyl alcohol, nitric acid, polyethylene glycol and ceramic particles as shown at 42, b) providing a length of fabric, the fabric comprising a plurality of ceramic fibres as shown at 44, c) applying slurry to both sides of the length of fabric such that the slurry adheres to the sides of the length of fabric and impregnates the length of fabric as shown at 46, d) drying the slurry impregnated length of fabric as shown at 48, e) cutting the slurry impregnated length of fabric into a plurality of pieces of slurry impregnated laminates of fabric as shown at 50, f) applying water to each of the pieces of slurry impregnated laminates of fabric to reactivate the slurry as shown at 52, g) stacking the plurality of pieces of slurry impregnated laminates of fabric on a first mould part as shown at 54 and step h) placing a second mould part over the first mould part and the stack of the plurality of pieces of slurry impregnated laminates of fabric as shown at 56, pressing the two mould parts together as shown at 58, drying the stack of the plurality of pieces of slurry impregnated laminates of fabric as shown at 60, and heating the stack of the plurality of pieces of slurry impregnated laminates of fabric as shown at 62, and i) sintering the stack of the plurality of pieces of slurry impregnated laminates of fabric to form a ceramic matrix composite article as shown at 64.

In step a) the slurry is formed from water, polyvinyl alcohol, nitric acid, polyethylene glycol and ceramic particles. The polyvinyl alcohol has a maximum molecular weight of 22 k and a minimum molecular weight of 10 k. A 10% solution of nitric acid is used as a dispersant. The nitric acid also used to control the ph of the slurry to approximately 3. The polyethylene glycol has a molecular weight of 400. The ceramic particles may be oxide particles, carbide particles, silicide particles, boride particles, nitride particles, silicate particles or a mixture of any two or more of these types of particles. More particularly the ceramic particles are silica particles, alumina particles, mullite particles or a mixture of any two or more of these types of particles. In this example the ceramic particles are alumina, preferably alpha alumina, and have a particle size of 150 nanometers, preferably there are coarse ceramic particles and fine ceramic particles to minimise drying shrinkage in the matrix rich regions of the ceramic matrix composite. The slurry is formed by initially making a solution of 5 wt % polyvinyl alcohol in water. Then all the liquid constituents are added together in the proportions of 20 cm$^3$ solution of 5 wt % polyvinyl alcohol, 4 cm$^3$ of deionised water, 2 cm$^3$ of 10% nitric acid and 2 cm$^3$ of polyethylene glycol. Finally 60 g of alumina particles are added into the solution in 10 g or 20 g batches and the alumina particles are dispersed thoroughly through the slurry.

In step b) either de-sized fabric is obtained or fabric is obtained and the fabric is de-sized. In step b) the fabric may be initially cut to an appropriate width and length suitable for the particular article. The fibres of the fabric comprise ceramic fibres, for example silicon carbide fibres, silicon nitride fibres, alumina fibres, mullite fibres, aluminosilicate fibres or alumina-mullite fibres and the fabric may comprise a mixture of any two or more of these types of fibres. For example the fibres may comprise a mixture of alumina and mullite, e.g. the fabric may be woven from Nextel® 720 fibres, which are an alumina-mullite fibres.

In step c) the slurry is applied to, coated on, a first side of the length of fabric and then a roller is used to push the slurry through the length of fabric. Then the length of fabric is turned over and the slurry is applied to, coated on, a second side of the length of fabric and then a roller is used to push the slurry through the length of fabric. The application of the slurry to the first and second sides of the length of fabric fully impregnates the slurry into the length of fabric. It may be possible to apply the slurry to only one of the sides of the length of is fabric and to use a roller to push the slurry through the length of fabric to fully impregnate the slurry into the length of fabric. Step c) may be fully automated using the rollers to apply slurry to one side, or both sides, of the length of fabric to fully impregnate the slurry into the length of fabric and this allows long lengths of fabric to be fully impregnated with slurry.

In step d) the length of slurry impregnated fabric is allowed to dry for several hours at room temperature. If step c) is automated then the length of slurry impregnated fabric is heated to dry the length of slurry impregnated fabric much more quickly to reduce the drying time and preferably the water is evaporated from the length of slurry impregnated fabric in a minutes rather than hours, using radiant, convection or microwave heaters or a combination of two or more thereof.

In step e) the length of slurry impregnated fabric is cut into a plurality of pieces of slurry impregnated laminates of fabric using a rotary cutter, a laser or other suitable cutter.

In step f) water is applied to each of the pieces of slurry impregnated laminates of fabric to reactivate the slurry and the water may be applied by spraying water, dipping in water or using a roller sponge. The reactivation of the slurry on the pieces of slurry impregnated laminates of fabric is by adding sufficient water to make the pieces of slurry impregnated laminates of fabric tacky.

In step g) the plurality of pieces of slurry impregnated laminates of fabric are stacked on a first mould part and the pieces of slurry impregnated laminates of fabric are then rollered. Each of the pieces of slurry impregnated laminates of fabric is dried such that it has a residual water content of between 10% and 15% before stacking on the first mould part.

In step h) a second mould part is placed over the first mould part and the stack of the plurality of pieces of slurry impregnated laminates of fabric and the second mould part is clamped to the first mould part with spacers to provide a predetermined distance between the first and second mould parts. Pressure is applied to the stack of the plurality of pieces of slurry impregnated laminates of fabric while the stack is between the first and second mould parts and the pressure is applied at room temperature. The pressure applied during step h) may be up to about 1 tonne. Then in step h) the stack of the plurality of pieces of slurry impregnated laminates of fabric is dried for several hours at room temperature while between the first and second mould pieces. The drying of the stack may occur at the same time as the pressure is applied to the stack. Next in step h) the stack of the plurality of pieces of slurry impregnated laminates of fabric are heated to a temperature of 80° C. for up to 12 hours at in an autoclave and are heated to a temperature of 120° C. for 2 hours in the autoclave to remove the water and to consolidate the stack of the plurality of pieces of slurry impregnated laminates of fabric. Step h) comprises a heat treatment cycle where the temperature is ramped up gradually with holds for predetermined periods of time to firstly dry and secondly to consolidate the pieces of slurry impregnated laminates of fabric, the steps are in the temperature range of 50° C. to 150° C. for up to 15 hours in total.

In step i) the stack of the plurality of pieces of slurry impregnated laminates of fabric are heated to form a ceramic matrix composite article by sintering at a temperature of 1100° C. to 1300° C. for up to 10 hours, e.g. sintering at a temperature of 1200° C. plus or minus 20° C. for up to 10 hours in a furnace in order to remove the polymer binder, to densify the ceramic matrix and to form the ceramic matrix composite article. Step i) may comprise increasing the temperature at a controlled rate with the temperature being maintained at one or more predetermined temperatures for respective predetermined periods of time.

Figure 5:
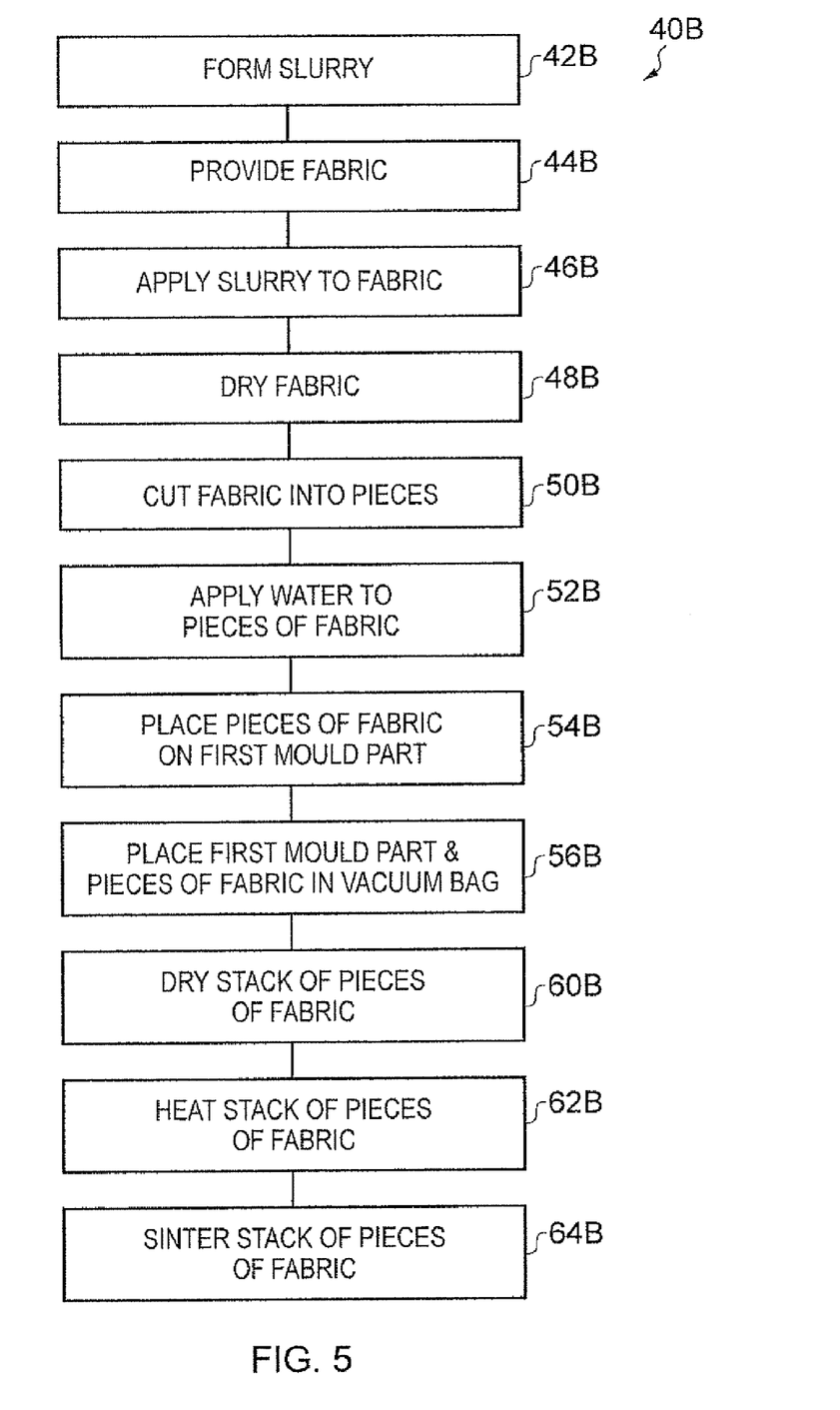
FIG. 5 is a flow chart of an alternative method of manufacturing a ceramic matrix composite article according to the present invention.

A further method of manufacturing 40B a ceramic matrix composite article 24 according to the present invention, as shown in FIG. 5, comprises a) forming a slurry comprising water, polyvinyl alcohol, nitric acid, polyethylene glycol and ceramic particles as shown at 42B, b) providing a length of fabric, the fabric comprising a plurality of ceramic fibres as shown at 44B, c) applying slurry to both sides of the length of fabric such that the slurry adheres to the sides of the length of fabric and impregnates the length of fabric as shown at 46B, d) drying the slurry impregnated length of fabric as shown at 48B, e) cutting the slurry impregnated length of fabric into a plurality of pieces of slurry impregnated laminates of fabric as shown at 50B, f) applying water to each of the pieces of slurry impregnated laminates of fabric to reactivate the slurry as shown at 52B, g) stacking the plurality of pieces of slurry impregnated laminates of fabric on a first mould part as shown at 54B, h) placing the first mould part and the stack of the plurality of pieces of slurry impregnated laminates of fabric in a vacuum bag as shown at 56B, drying the stack of the plurality of pieces of slurry impregnated laminates of fabric as shown at 60B, heating the stack of the plurality of pieces of slurry impregnated laminates of fabric as shown at 62B, and i) sintering the stack of the plurality of pieces of slurry impregnated laminates of fabric to form a ceramic matrix composite article as shown at 64B.

The method shown in FIG. 5 is substantially the same as that described with reference to FIG. 4 and the same parameters, conditions and materials described with reference to FIG. 4 are used in the method shown in FIG. 5. The method described with reference to FIG. 5 differs in that instead of placing a second mould part on the stack of the plurality of pieces of slurry impregnated laminates of fabric and pressing the first and second mould parts together the first mould part and the stack of the plurality of pieces of slurry impregnated laminates of fabric are placed in a vacuum bag and the vacuum bag is evacuated during the steps of drying and heating the stack of the plurality of pieces of slurry impregnated laminates of fabric so that the vacuum pressure helps to consolidate the stack of the plurality of pieces of slurry impregnated laminates of fabric. The drying and heating of the stack of the plurality of pieces of slurry impregnated laminates of fabric in the vacuum bag may also take place in an autoclave.

The amount of binder and plasticiser added is a fractional weight of the ceramic particles, e.g. alumina particles, in the range of 1 to 10 wt %.

It may be possible to include a ceramic precursor in the slurry, the ceramic precursor is a water soluble compound containing ions, which when incorporated into the ceramic matrix decompose on heating to form a fine particulate ceramic. For example in the case of an alumina matrix composite the slurry may comprise an alumina precursor, the alumina precursor is a water soluble compound containing aluminium ions, which when incorporated into the ceramic matrix decompose on heating to form a fine particulate alumina. For a silicon carbide matrix, a silicon precursor, e.g. a water soluble compound containing silicon ions, is provided in the slurry. For a mullite matrix, a silica precursor and an alumina precursor, e.g. a water soluble compound containing silicon ions and a water soluble compound containing aluminium ions, is provided in the slurry. An example of an alumina precursor is aluminium chloride hexahydrate.

An example of a slurry containing an alumina precursor comprising 18.57 wt % de-ionised water, 4.64 wt % polyvinyl alcohol, 1.94 wt % 10% nitric acid, 1.75 wt % polyethylene glycol, 3.48 wt % aluminium chloride hexahydrate and the remainder alumina particles and incidental impurities. A slurry containing an alumina precursor comprises 69.4 ml of polyvinyl alcohol, 300 ml of deionised water, 30 ml of 10% nitric acid, 25 ml of polyethylene glycol, 8.26 ml of aluminium chloride hexahydrate and 220 g of alumina particles or multiples of this formula. The porosity of the finished ceramic matrix composite component is about 26% or less, making this suitable for the applications in a gas turbine engine. Porosity of 26% is optimum, because porosity less than 26% would make the ceramic matrix composite component to brittle and some porosity is required for crack deflection and to allow fibre de-bonding. The strength of the finished ceramic matrix composite component has been measured and is greater than 100 MPa. The ceramic matrix composite component of the present invention is suitable for use as a high temperature structural component, for example at temperatures of 1200° C. The ceramic matrix composite article is a component of a gas turbine engine, for example the component is a component of a combustion chamber, a component of a turbine or a component of an exhaust. The component of a combustion chamber may be a wall, a tile or a heat shield. The component of a turbine may be a turbine blade, a turbine vane, a seal segment or component defining the flow path through the turbine. The component of an exhaust system may be a mixer, a tail cone or a petal, or segment, of a nozzle.

The key advantage of the present invention is the incorporation of polymer binders and plasticisers in the slurry with the ceramic particles to produce an impregnated fabric that may be fully dried and subsequently reactivated for consolidation. It is believed that the ceramic precursor, e.g. alumina precursor, aids the impregnation of a fabric that may be fully dried and subsequently reactivated for consolidation. It is believed that the ceramic precursor, e.g. alumina precursor, provides a finer precipitation of ceramic particles, e.g. alumina. This makes handling of the impregnated fabric easier and maintains the fibres of the fabric in their original positions during handling, cutting and lay-up. This advantage provides the benefit of producing a ceramic matrix composite article that is more consistent in terms of its structure and its properties. The use of pressure during consolidation in the autoclave provides an advantage over the vacuum bag technology in that the higher pressure applied improves the consolidation of the stack of the plurality of pieces of slurry impregnated laminates of fabric, producing a ceramic matrix composite article which is less prone to delamination and which is more consistent in terms of mechanical properties.

The present invention provides a robust industrial scale manufacturing method for ceramic matrix composite articles. The present invention provides slurry impregnated laminates of fabric which may be handled without loss of either matrix material and without fraying of the fibres of fabric. The slurry impregnated laminates of fabric, prepreg sheets, are flexible, can be cut without loss of matrix material and without fraying of the fibres of the fabric and the slurry impregnated laminates of fabric have the required amount of ceramic particles for the ceramic matrix after burn out of the binder. The present invention allows the use of an automated manufacturing method to produce the ceramic matrix composite articles by allowing automation of steps a) to c) or only step c).

Although the present invention has been described with reference to ceramic matrix composite components for a gas turbine engine it may equally well be used to make ceramic matrix composite articles or components for other apparatuses or applications.

Although the present invention has been described with reference to the use of polyvinyl alcohol and polyethylene glycol to form a polymer binder other suitable polymer binders may be used, for example poly acrylic acid, poly vinylpyrolidone (PVP), methyl cellulose, poly propylene glycol or poly ethylene glycol. Although the present invention has been described with reference to the use of nitric acid as a dispersant, and to control the ph, other suitable dispersants may be used.

The invention claimed is:

1. A method of manufacturing a ceramic matrix composite article comprising the steps of:—
    a) forming a slurry consisting of water, dispersant, a water soluble polymer binder and ceramic particles,
    b) providing a length of fabric, the fabric comprising a plurality of ceramic fibres,
    c) applying slurry to at least one of the sides of the length of fabric such that the slurry adheres and impregnates the length of fabric,
    d) drying the slurry impregnated length of fabric,
    e) cutting the slurry impregnated length of fabric into a plurality of pieces of slurry impregnated laminates of fabric,
    f) applying water to each of the pieces of slurry impregnated laminates of fabric to reactivate the slurry,
    g) stacking the plurality of pieces of slurry impregnated laminates of fabric on a first mould part,
    h) consolidating the plurality of pieces of slurry impregnated laminates of fabric on the mould part, and
    i) sintering the stack of the plurality of pieces of slurry impregnated laminates of fabric to form a ceramic matrix composite article.

2. A method as claimed in claim 1 wherein step h) comprises placing a second mould part over the first mould part and the stack of the plurality of pieces of slurry impregnated laminates of fabric and pressing the two mould parts together.

3. A method as claimed in claim 1 wherein step h) comprises placing the first mould part and the stack of the plurality of pieces of slurry impregnated laminates of fabric into a vacuum bag and evacuating the vacuum bag.

4. A method as claimed in claim 1 wherein step h) comprises drying the stack of the plurality of pieces of slurry impregnated laminates of fabric and heating the stack of the plurality of pieces of slurry impregnated laminates of fabric.

5. A method as claimed in claim 1 wherein step a) the ceramic particles are selected from the group consisting of oxide particles, carbide particles, silicide particles, boride particles, nitride particles, silicate particles and a mixture of any two or more of these types of ceramic particles.

6. A method as claimed in claim 1 wherein in step a) the ceramic particles are selected from the group consisting of silica particles, alumina particles, mullite particles and a mixture of any two or more of these types of particles.

7. A method as claimed in claim 1 wherein in step b) the ceramic fibres are selected from the group consisting of silicon carbide fibres, silicon nitride fibres, alumina fibres, mullite fibres, aluminosilicate fibres and alumina-mullite fibres.

8. A method as claimed in claim 7 wherein in step b) the fabric comprises a mixture of any two or more of these types of fibres.

9. A method as claimed in claim 1 wherein step c) comprises applying slurry to both of the sides of the length of fabric such that the slurry adheres to and impregnates the length of fabric.

10. A method as claimed in claim 1 wherein step h) comprises heating at a temperature of 50° C. to 150° C. for up to 15 hours.

11. A method as claimed in claim 10 wherein step h) comprises heating at a temperature of 80° C. for up to 12 hours to remove water from the impregnated laminates of fabric.

12. A method as claimed in claim 10 wherein step h) comprises heating at a temperature of 120° C. for 2 hours.

13. A method as claimed in claim 1 wherein step i) comprises sintering at a temperature of 1100° C. to 1300° C. for up to 10 hours.

14. A method as claimed in claim 13 wherein step i) comprises sintering at a temperature of 1200° C. for up to 10 hours.

15. A method as claimed in claim 1 wherein step d) comprises drying for 2 to 4 hours at room temperature.

16. A method as claimed in claim 1 wherein step a) comprises forming a slurry consisting of water, polyvinyl alcohol, nitric acid, polyethylene glycol and ceramic particles only.

17. A method as claimed in claim 16 wherein the ceramic matrix composite comprises an alumina matrix composite and wherein step a) comprises forming a slurry comprising 26 wt % water, 1.14 wt % polyvinyl alcohol, 2.28 wt % nitric acid, 2.28 wt % polyethylene glycol and the remainder alumina particles and incidental impurities.

18. A method as claimed in claim 16 wherein the ceramic matrix composite comprises an alumina matrix composite and wherein the slurry in step a) comprises 20 cm3 solution of 5 wt % polyvinyl alcohol, 4 cm3 of deionised water, 2 cm3 of 10% nitric acid and 2 cm3 of polyethylene glycol and 60 g of alumina particles or multiples of this formula.

19. A method as claimed in claim 1 wherein the ceramic matrix composite article is a component of a gas turbine engine.

20. A method as claimed in claim 19 wherein the component is a component of a combustion chamber, a component of a turbine or a component of an exhaust system.

21. A method as claimed in claim 20 wherein the component of a combustion chamber is a combustion chamber wall, a tile or a heat shield.

22. A method of manufacturing a ceramic matrix composite article comprising the steps of:—
    a) forming a slurry consisting of water, dispersant, a water soluble polymer binder, ceramic particles and a ceramic precursor,
    b) providing a length of fabric, the fabric comprising a plurality of ceramic fibres,
    c) applying slurry to at least one of the sides of the length of fabric such that the slurry adheres and impregnates the length of fabric,
    d) drying the slurry impregnated length of fabric,
    e) cutting the slurry impregnated length of fabric into a plurality of pieces of slurry impregnated laminates of fabric,
    f) applying water to each of the pieces of slurry impregnated laminates of fabric to reactivate the slurry, g) stacking the plurality of pieces of slurry impregnated laminates of fabric on a first mould part, h) consolidating the plurality of pieces of slurry impregnated laminates of fabric on the mould part, and i) sintering the stack of the plurality of pieces of slurry impregnated laminates of fabric to form a ceramic matrix composite article.

23. A method as claimed in claim 22 wherein step a) comprises forming a slurry consisting of water, polyvinyl alcohol, nitric acid, polyethylene glycol, ceramic particles and a ceramic precursor.

24. A method as claimed in claim 23 wherein the ceramic precursor is an alumina precursor, a silica precursor or a combination of an alumina precursor and a silica precursor.

25. A method as claimed in claim 23 wherein the ceramic matrix composite comprises an alumina matrix composite and wherein the slurry in step a) comprises 18.57 wt % de-ionised water, 4.64 wt % polyvinyl alcohol, 1.94 wt % nitric acid, 1.75 wt % polyethylene glycol, 3.48 wt % aluminium chloride hexahydrate and the remainder alumina particles and incidental impurities.

26. A method as claimed in claim 23 wherein the ceramic matrix composite comprises an alumina matrix composite and wherein the slurry in step a) comprises 69.4 ml of polyvinyl alcohol, 300 ml of deionised water, 30 ml of 10% nitric acid, 25 ml of polyethylene glycol, 8.26 ml of aluminium chloride hexahydrate and 220 g of alumina particles or multiples of this formula.

* * * * *